Oct. 27, 1970            A. F. SPILHAUS            3,535,819
DESCENDING MUSIC BOX AND THE LIKE
Filed June 1, 1966                                3 Sheets-Sheet 1
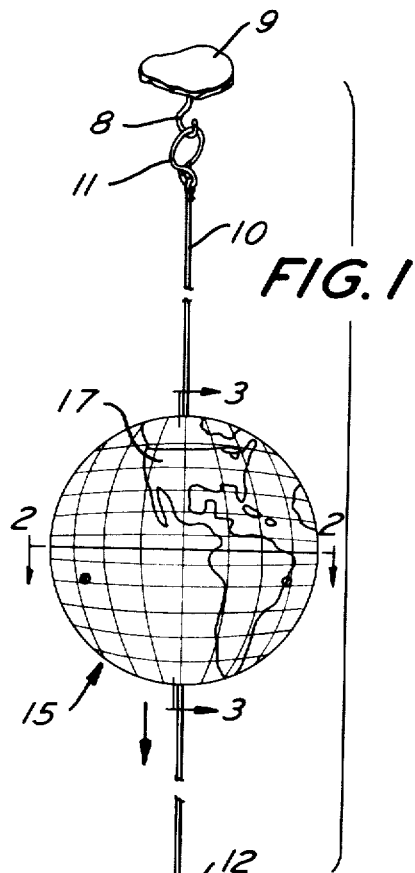
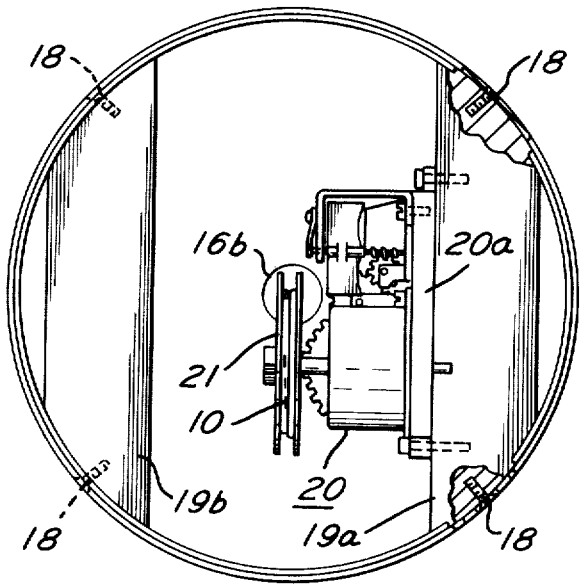
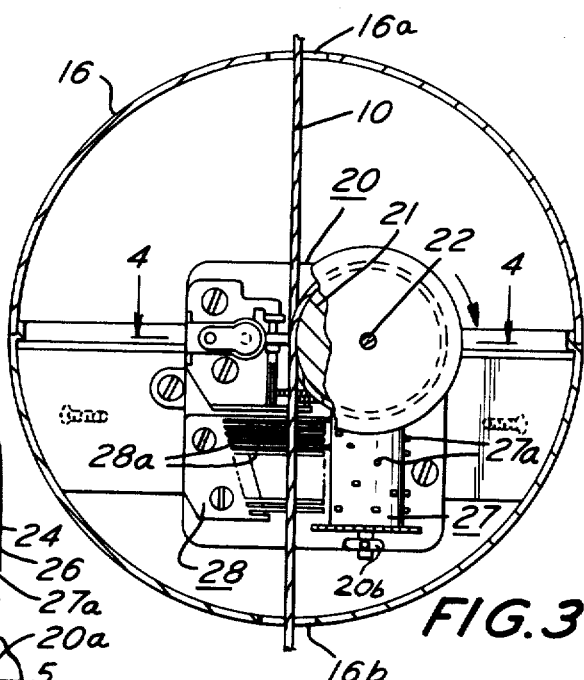
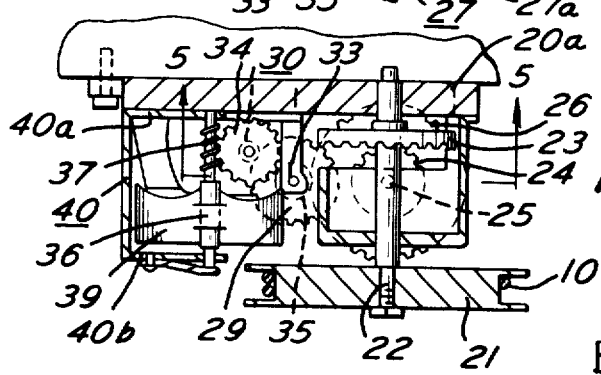
INVENTOR.
ATHELSTAN F. SPILHAUS
BY
Bilker, Kimmelman & Mayerman
ATTORNEYS.

Oct. 27, 1970  A. F. SPILHAUS  3,535,819
DESCENDING MUSIC BOX AND THE LIKE
Filed June 1, 1966  3 Sheets-Sheet 2
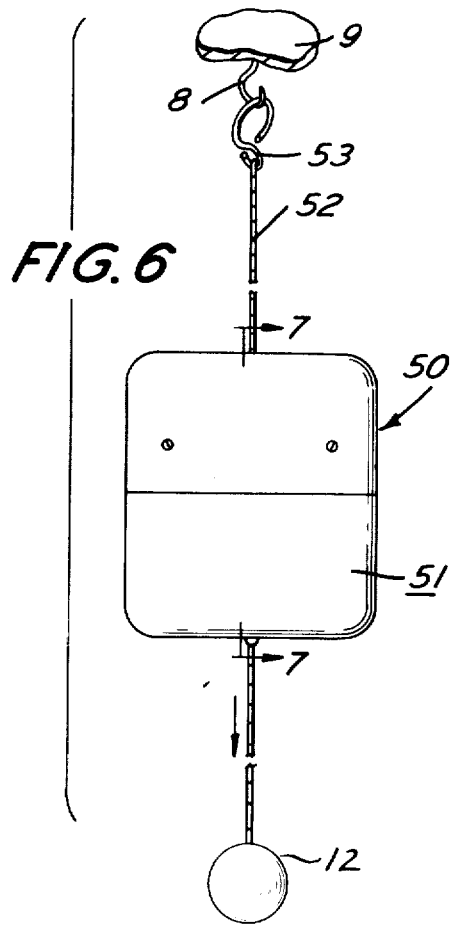
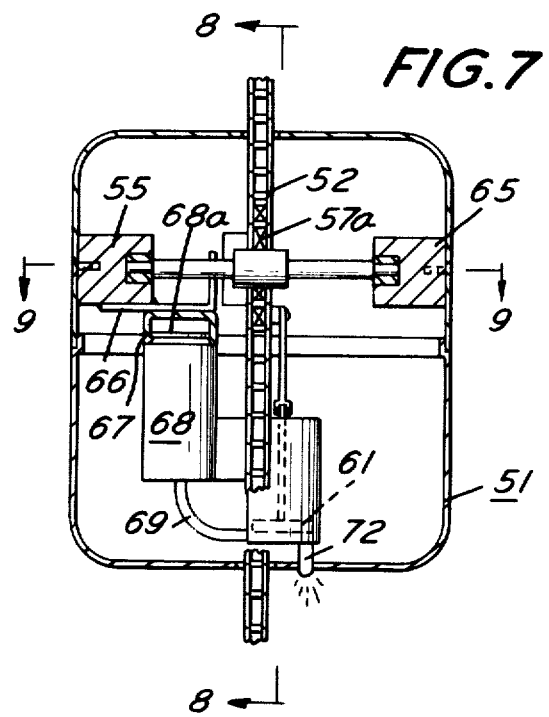
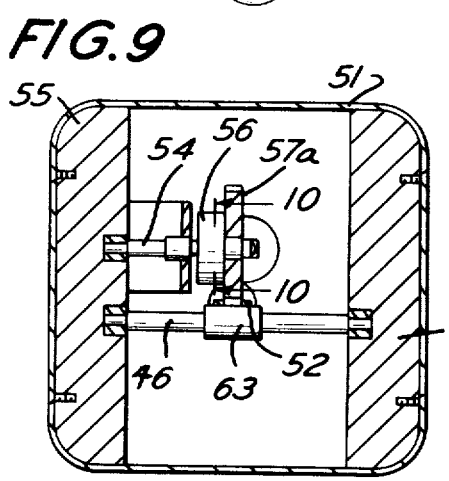
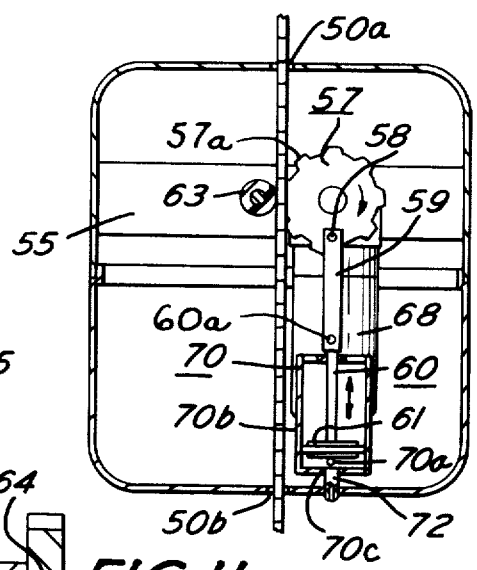
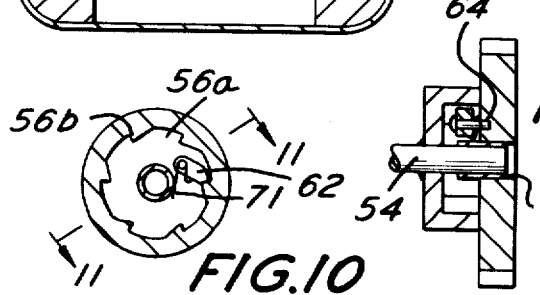
INVENTOR.
ATHELSTAN F. SPILHAUS
BY
Bilker, Kimmelman & Moyerman
ATTORNEYS.

Oct. 27, 1970     A. F. SPILHAUS     3,535,819

DESCENDING MUSIC BOX AND THE LIKE

Filed June 1, 1966     3 Sheets-Sheet 3

INVENTOR.
ATHELSTAN F. SPILHAUS

BY

Bilker, Kimmelman & Moyerman
ATTORNEYS.

United States Patent Office 3,535,819
Patented Oct. 27, 1970

3,535,819
DESCENDING MUSIC BOX AND THE LIKE
Athelstan F. Spilhaus, Mound, Minn., assignor to Experimentoy Corporation, Minneapolis, Minn., a corporation of Minnesota
Filed June 1, 1966, Ser. No. 554,409
Int. Cl. A63h 5/00
U.S. Cl. 46—175
13 Claims

ABSTRACT OF THE DISCLOSURE

A cord is provided on which a device such as a music box is disposed for slow travel down the cord. The music box has a cylindrical tone-producing drum connected by gears to a shaft on which a pulley is mounted. The cord is wound around the pulley and the weight of the music box causes the pulley and the drum to rotate constantly as the box descends thereby powering the music box for sound production throughout its descent. Other sensory display applications are also taught.

---

This invention relates to a gravity powered device and in particular to a gravity powered device which moves slowly down a flexible elongated member, the member and the device cooperating to power the device so that it produces a sensory display throughout its descent.

While devices are known in which an object moves down a smooth pole or a twisted metallic ribbon or even down a somewhat resilient object, such prior art devices generally produced their results merely by reacting to gravity or following the twists of the ribbon, or the like.

It is therefore among the objects of the present invention to provide:

(1) A device which is powered by its travel down a vertically-disposed string, tape or the like, and which is powered by its coupling to the string or tape so as to produce an auditory or other sensory display throughout its descent.

(2) A toy or the like which travels without rotation down a string, tape or the like under the sole influence of gravity, all the while producing a sensory display by virtue of its being coupled to the string or tape.

(3) A music box which travels slowly down a string, tape or the like under the influence of gravity, the music box being continuously powered by its coupling to the string or tape.

Still other objects of the invention will occur to those skilled in the art on perusing this specification and the drawings herein.

In accordance with the present invention, there is provided an apparatus which includes an elongated member down which a device moves by virtue of its own weight. The device includes a driving means which engages successive portions of the elongated member and also includes apparatus driven by the driving means and which produces a sensory display. The display can take the form of a musical, visual or olfactory display, for example. In one form of the invention, the elongated member may be a string and the device may be a Swiss music-box which is coupled to the string and emits music so long as it travels down the string under the influence of gravity. In another form, the device can be made to produce light as it travels down and engages the string. Other forms of the invention are also set forth hereinafter.

FIG. 1 is a side elevation view of the novel assembly according to one form of the present invention.

FIG. 2 is a plan view of the movable device shown in FIG. 1 taken along a horizontal plane approximately bisecting the device.

FIG. 3 is a sectional view of the device taken along the section line 3—3 in the direction indicated in FIG. 1.

FIG. 4 is a fragmentary sectional view of a portion of the device shown in FIG. 3 and taken along the section line 4—4 therein.

FIG. 5 is a fragmentary sectional view of a portion of the apparatus shown in FIG. 4 and taken along the section line 5—5 therein.

FIG. 6 is a side elevation view of still another form of the invention which sprays out an atomized liquid as the object descends.

FIG. 7 is a sectional view of the apparatus shown in FIG. 6 taken along the section line 7—7.

FIG. 8 is a sectional view of the apparatus shown in FIG. 7 taken along section line 8—8.

FIG. 9 is a sectional view of the apparatus shown in FIG. 7 taken along section line 9—9.

FIG. 10 is a sectional view of a fragment of the apparatus shown in FIG. 9 taken along the section line 10—10.

FIG. 11 is a sectional view of a fragment of the apparatus shown in FIG. 10 taken along section line 11—11.

Figure 12:
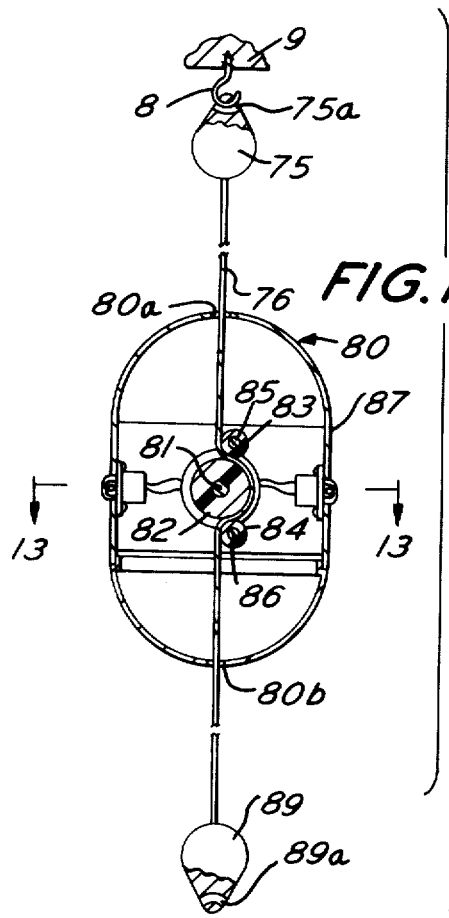
FIG. 12 is a side elevation and partly sectional view of another form of the invention in which a light is produced during the descent of the device.

As shown in FIG. 1, there is shown suspended from a hook 8 embedded in a stationary object 9 a string 10 attached to a ring 11 that is slipped over the hook 8. A movable device depicted generally at the numeral 15 is coupled to and gradually moves down the string 10. The other end of the string 10 is attached to a weight 12 which serves to keep it taut. On the shell 16 of the device 15 there may be indicia such as the indicia 17 depicting a world globe, for example. In this form of the present invention the device 15 includes a music-producing means which, as it moves downward along the string 10 under the influence of gravity, is constantly powered by its frictional engagement with the string. Thus, music is produced continuously throughout the entire descent of the device, the length of the string determining the length of the musical program.

Within the shell 16 there are two weighting and mounting members 19a and 19b attached to the shell 16 by bolts 18, for example. Attached by means of bolts or other suitable connecting and securing means to the member 19a is the base 20a of a music-box assembly 20. The string 10 is looped one turn around a pulley 21 fixed to a shaft 22 whose end is journalled in an aperture in the base 20a. As the combined weight of the members 19a, 19b and the assembly 20 tend to pull the device 15 downward, the frictional engagement of the string 10 with the pulley 21 cause a shaft 22 to rotate clockwise (as seen in FIG. 3). A ring gear 23 is affixed to the shaft 22 and rotates therewith. Gear 23 engages the teeth of a gear 24 mounted upon a shaft 25 whose ends are journalled in apertures in a wall of a housing 23a for gear 23 and in a member 20b projecting from the base 20. Another gear 26, as well as a musical drum 27, are also affixed to the shaft 22 for rotation therewith. The music-box mechanism includes a plurality of tines 28a which engage perforated protuberances 27a of the drum 27 as the latter rotates thereby causing the production of various musical notes. Thus, rotation of the pulley 21 and shaft 22 drives, through the various gears mentioned, the music producing portion of the device 15.

As the drum 27 is caused to rotate while the device 15 is moving down the string 10, another portion of the novel assembly is simultaneously brought into play primarily to maintain substantially constant the speed of descent. If this were not provided, the music emanating from the device 15 would be subject to erratically varying tempi. Furthermore, maintenance of constant speed is desired in order to give a soothing visual effect.

Accordingly, while the gear 26 rotates, its teeth engage the teeth of gear 35 fixedly mounted to a shaft 33 journalled in apertures in support members 31 and 38 fixed to the base 20a. Also attached to the shaft 33 is another gear which rotates therewith, the teeth of the gear 29 engaging ridges 30a formed in a shaftlike member 30 whose ends are journalled in apertures in support members 31 and 32 affixed to the base 20a. Another gear 34 is fixed to the member 30 for rotation therewith, its teeth engaging the wormlike threads 37 formed in the shaft 36. The ends of the shaft 36 are respectively journalled in apertures in portions 40a and 40b of a bracket 40 that is attached to the base 20a. Blades or vanes 39 are fixed to the shaft 36 to act as a speed governor. As the pulley rotational speed increases, this is transmitted through the gear train to the shaft 36 which rotates the vanes 39 faster thereby producing a greater air resistance which tends to oppose the speed increase. The converse is true in the event of a slowdown in the rotational velocity of the pulley 21.

Either at the end of its descent on the string or at any other point therein, the device 15 may be moved upward thereon to recommence its cycle of operation. This is done simply by grasping the device 15 and moving it up to the desired point. In so doing, the turn of the string around the pulley 21 is considerably loosened so that there is practically no frictional resistance to the movement of the device upward.

The previous form of the invention was a device which produced a display of sound during its descent. The following forms are other embodiments of the invention in which other senses, namely the senses of smell and sight are involved.

FIGS. 6 through 11 show a form of the present invention in which, instead of a cord or the like, a chain is used to suspend the device and the device is powered during its descent by engagement of a sprocket wheel with the chain. The device indicated generally at the numeral 50 has openings 50a and 50b in the top and bottom of its housing 51 through which a chain 52 is passed. The top end of the chain is suspended by a hook 53 to a hook 8 fixed to the ceiling or other support 9. Within the housing 51 there is located a shaft 54 having one end journalled in a bushing in a fixed weighting member 55 that is attached to the housing 51 by bolts or any other method. Toward the other end of the shaft 54 there is located a sprocket 57 whose teeth engage, in succession, the spaces enclosed by the links of the sprocket chain 52. Fixed to the outer face 57a of the sprocket 57 is a horizontally projecting pin 58. The pin 58 passes through an aperture in a rigid tie rod 59. The lower end of rod 59 is connected to a shaft 60 which passes through an opening in the top of cylinder 70b. A piston head 61 is fixed to the lower end of the shaft 60.

A clutch or ratchet member 56 is fixed to and rotates with shaft 54. Member 56 has teeth 56b separated from one another by portions 56a. The sprocket 57 is mounted on a bushing 73 fitted around shaft 54 to permit rotation about the shaft. A horizontal pivot pin 64 passes through an aperture in a pawl 62 which is urged by a spring 71 in a generally counterclockwise direction (as seen in FIG. 10). Thus, as the device moves down chain 52 sprocket 57 is moved clockwise (FIG. 8) thus driving piston head 61 downward when the pin 58 travels from the 12 o'clock position to the 6 o'clock position.

An idler roller 63 made of a yieldable material such as rubber or plastic is fixed to a shaft 46 whose ends are respectively journalled in bushings in apertures formed in weighting members 55 and 65. The roller 63 helps to keep the sprocket chain 52 coupled to the teeth of the sprocket 57.

There is also an L-shaped bracket 66 fixed to the weighting and mounting member 55 by welding, for example. A clamping member 67 is connected to member 55 and is made to releasably engage the upper grooved rim 68a of a sump or reservoir 68. The reservoir 68 has an opening toward its lower end to which the upper end of a tube or conduit 69 is fixed, the other end of the conduit being connected to an opening 70a located toward the bottom of the vertical wall 70b of the cylinder 70. Into another opening 70c in the bottom of the cylinder 70 a nozzle 72 is disposed. The space between the piston 61 and the nozzle is kept constantly supplied from sump 68 with any liquid which is to be dispensed during the descent of the device 50. The liquid could be a perfume or deodorant, for example. The rate of descent of the device 50 will depend on the total weight of the device 50 and the resistance that the friction of the sprocket and the parts connected thereto present to its descent. The rate of descent may be slowed by a friction brake (not shown) pressing on shaft 54, or by interposing a gear train (not shown) or by a windage regulator such as is shown in FIG. 4.

At any desired point on the chain 52, the entire device may be raised to any higher point merely by holding the lower part of the chain 52 taut and sliding the device upward with the other hand. In this direction the sprocket 57 and hence pin 64 will be moving counterclockwise so the pawl 62 will slip over the teeth 56b.

It will be seen that as the weight of the device 50 impels it downwardly, the links of the sprocket chain 52 are successively engaged by teeth 57a of wheel 57. The wheel 57 is thereby caused to rotate and its rotary motion is converted into vertical motion by means of the connecting rod 59. This rod 59 causes the piston 60 to move downward for at least half of the rotation of the wheel 57 so that the liquid in cylinder 70 is atomized when forced through nozzle 72.

Figure 13:
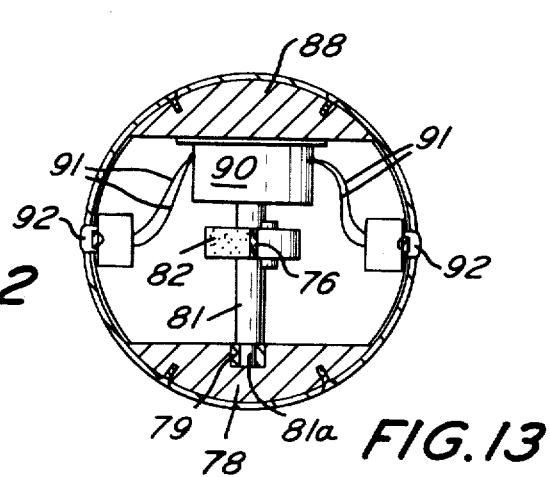
FIG. 13 is a sectional view of the apparatus shown in FIG. 12 taken along the section line 13—13.

FIGS. 12 and 13 depict still another form of the invention in which the sensory display involved is the sense of vision. A device 80 travels down a ribbon or tape 76. The ends of the tape 76 are fixed to identical weight or hanging members 75 and 89. As shown in FIG. 12, weight 75 includes a passageway 75a which engages the hook 8. There is a corresponding passageway 89a in the lower weight 89. In this version, the tape passes through openings 80a and 80b in the housing 87. The tape also is threaded between a principal driving roller 82 and, in turn, idler rollers 83 and 84 which are mounted for rotation upon shafts 85 and 86 respectively. The ends of the shafts 85 and 86 are journalled in appropriate side mounting members (not shown) located inside the housing 87. The main driving roller 82 is mounted upon a shaft 81 one of whose ends 81a is disposed in a bushing fitted into a recess in weighting and mounting member 78 which is also attached to the housing 87. The other end of the shaft 81 is connected directly (or indirectly through a step-up gear train) to a segmented magnet (not shown) that rotates within a generating assembly 90. Assembly 90 is affixed to weighting and mounting member 88 that is also attached to the housing 87. The generating assembly 90 also includes a number of field windings disposed around the segmented permanent magnet so that rotation of the magnet therein induces a voltage in the field windings. The current thus induced is applied via two pairs of leads 91 to light up two bulbs 92, fitted in apertures in housing 87.

It may be seen that when the device 80 reaches the end of its descent (or at any other point thereon) a new cycle of operation may be initiated by detaching suspending weight 87 from the hook 8, inverting the entire suspending weight 75 becomes the tensioning weight, and then placing the tensioning weight 89 on top so that its passageway 89a now engages the hook 8.

It will be noted that in this embodiment there is no need to wrap the elongated ribbon 76 completely around the main roll 82 in order to obtain the desired frictional engagement. Of course, suitable retarding devices such as used in the other embodiments may be used to slow the descent.

Figure 14:
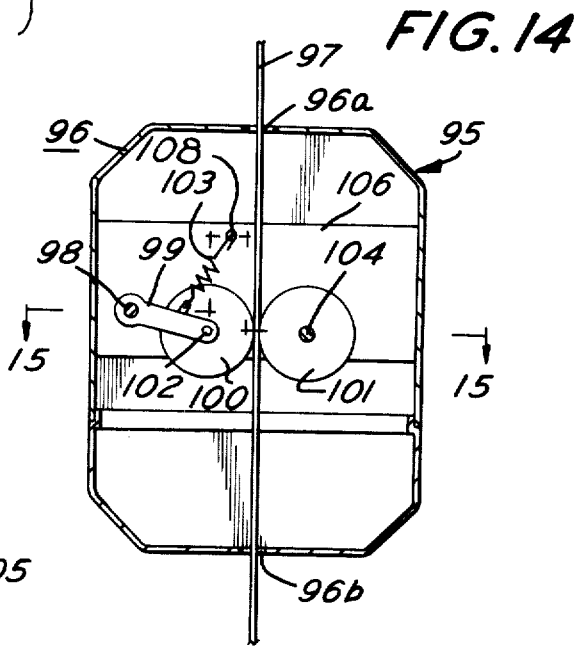
FIG. 14 is a side elevation and partly sectional view of another form of the invention showing a different form of driving means which is easily releasable when it is desired to start a new cycle of operation.
Figure 15:
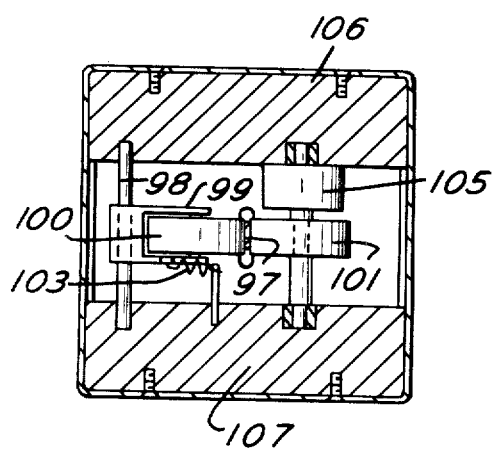
FIG. 15 is a sectional view of the apparatus shown in FIG. 14 taken along the section line 15—15 thereof.

FIGS. 14 and 15 show still another form that the invention may take, especially with reference to the means for coupling the driving mechanism to the elongated member and the means for enabling rapid raising of the device at the end (or at any other point) of its descent.

The device 95 includes a housing 96 having a top and bottom apertures 96a and 96b, respectively. A tape 97 passes through these aligned apertures and between an idler roller 100 and a driving roller 101. Driving roller 101 is mounted upon a shaft 104 one of whose ends is journalled within a bushing in a recess in weighting member 107. A utilization device of any suitable kind is indicated schematically at numeral 105. It could, for example, be the generator 90 as shown in FIG. 13, or the rotating drum of a music box as shown in FIGS. 1–5. The other end of the shaft 104 is journalled in a bushing located in a recess formed in weighting and mounting member 106.

The idler roller 100 is mounted for rotation between the arms of a bracket 99 which itself is mounted for pivoting about a shaft 98 whose ends are fixed in recesses in members 106 and 107, respectively. A spring 103, connected to one of the arms of the bracket 99 and to a horizontally projecting pin 108 affixed to member 107, constantly urges the roller 100 toward roller 101.

It will be seen that when the rollers 100 and 101 are in the position shown in FIG. 14, the tape 97 is somewhat squeezed between them as the weight of the device 95 impels it downward. When the device moves downward, both rollers 100 and 101 will be caused to rotate in opposite directions. Therefore, the shaft 104 will be revolved and will drive the actuating portion of the utilization device 105.

At any point in its descent, the device can be moved to any higher point on the tape 97 merely by holding the lower end of the tape with one hand and raising the device 95 with the other. In the upward direction movement of the device the bracket 99 will tend to be pivoted in a clockwise direction thereby lessening the pinching effect exerted on the tape by rollers 100 and 101.

Another embodiment of the invention (not shown) could be a gravity-powered tape recorder and/or playback device. In this case the driving unit coupled to the string could include a shaft which caused the tape to be payed out in the forward direction and rewound in the opposite direction. This shaft could be part of a self-contained tape cartridge which could be of the "endless" variety. The ends of the shaft could be fitted wihtin an elongated vertical slot formed in the device's housing. During downward movement of the device, the shaft would revolve at the top of the slot. In order to assure relatively constant velocity the tape would be pressed against a rubber or similar roller coupled to a speed regulation device such as the regulator 39 (FIG. 4) which is mounted to the housing of the device. At any point in the downward course, the operator could move the device upward to any desired point by lifting it whereupon the shaft ends would move downward in the slot and the pressure of the speed regulator roller or the tape would cease. Thus, the movement could be made with very little force. Also, as the shaft was rotated in the opposite direction by the friction of the string the tape would be rewound to a point theron corresponding to the higher point on the string.

Of course, still other embodiments of the present invention which do not depart from the essence thereof will occur to one skilled in the art upon perusal of the figures and specification herein. Consequently, it is desired that the invention be limited only by the claims which follow.

I claim:

1. (a) an elongated member, and (b) a device mounted upon said member and having a weight which solely causes it to move only downward thereupon under the influence of gravity, said device including
   (i) driving means which engage successive portions of said member and
   (ii) means coupled to and driven by said driving means for producing a sensory display while said device is moving downward on said member.

2. The combination according to claim 1 wherein said elongated member is flexible, wherein said driving means rotates upon engagement with said successive portions, wherein said device includes a portion which does not rotate, and wherein said sensory display is the production of a plurality of musical tones.

3. The combination according to claim 2 wherein means are provided to suspend one end of said flexible member, wherein said device includes a rotation member around which a portion of said flexible member is wound.

4. The combination according to claim 2 wherein said flexible member is a piece of string, wherein said rotating member is a pulley and wherein the lower end of said string is provided with a weight tending to keep said string under tension.

5. The combination according to claim 4 wherein said device has a housing in which said driving means and said means for producing said sensory display are disposed, said housing having two apertures therein through which said string passes.

6. The combination according to claim 1 wherein said elongated member is a chain and wherein said driving means includes a member which engages successive links of said chain.

7. The combination according to claim 1 wherein said sensory display is an olfactory display.

8. The combination according to claim 1 wherein said sensory display is a visual display.

9. The combination according to claim 6 wherein said member which engages said links is a toothed rotary member and wherein said sensory display-producing means includes a fluid particle-dispensing means actuated in response to rotation of said rotary member.

10. The combination according to claim 1 with the addition of means permitting operation of said device by suspending said elongated member from either end thereof.

11. The combination according to claim 1 wherein said elongated member is a flexible ribbonlike member and wherein said driving means includes a plurality of rollers through which said ribbonlike member is threaded.

12. The combination according to claim 11 wherein said plurality of rollers includes:
   a driving roller coupled to said sensory display-producing means,
   said driving roller being revolvable around a fixed shaft,
   an idler roller mounted on a pivotable bracket and
   means for urging said idler roller toward said driving roller thereby to pinchingly engage said ribbonlike member between said rollers as said device moves downward, said idler roller tending to move away from said driving roller when said device is moved upward along said ribbonlike member.

13. (a) an elongated member adapted to be suspended vertically, and (b) a device mounted upon said member and having a weight which solely causes it to move only downward thereupon under the influence of gravity, said device including
  (i) driving means of which at least a portion rotates upon engagement with successive portions of said member and
  (ii) means coupled to and driven by said driving means for producing a sensory display while said device is moving downward on said member.

References Cited

UNITED STATES PATENTS

| | | | |
|---|---|---|---|
| 2,064,119 | 12/1936 | Irenius | 46—132 |
| 1,206,602 | 11/1916 | Scott | 46—47 |
| 3,078,614 | 2/1963 | Fors et al. | 46—47 X |

LOUIS G. MANCENE, Primary Examiner

R. F. CUTTING, Assistant Examiner

U.S. Cl. X.R.

46—192